US008120566B2

United States Patent
Kim

(10) Patent No.: US 8,120,566 B2
(45) Date of Patent: Feb. 21, 2012

(54) TIMING CONTROLLER AND DISPLAY DEVICE INCLUDING THE SAME

(75) Inventor: Myeong-Su Kim, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 399 days.

(21) Appl. No.: 12/503,415

(22) Filed: Jul. 15, 2009

(65) Prior Publication Data

US 2010/0156948 A1    Jun. 24, 2010

(30) Foreign Application Priority Data

Dec. 24, 2008    (KR) .................. 10-2008-0133749

(51) Int. Cl.
  *G09G 3/36*    (2006.01)
(52) U.S. Cl. ............ 345/98; 345/89; 345/690; 345/204; 345/100
(58) Field of Classification Search ............. 345/87–90, 345/98–102, 204, 690, 547, 548, 571
  See application file for complete search history.

(56) References Cited

U.S. PATENT DOCUMENTS

| | | | |
|---|---|---|---|
| 7,012,591 B2 * | 3/2006 | Chen et al. | 345/88 |
| 7,583,245 B2 * | 9/2009 | Kwon | 345/98 |
| 7,916,106 B2 * | 3/2011 | Kim | 345/89 |

FOREIGN PATENT DOCUMENTS

| | | |
|---|---|---|
| KR | 1020050065114 | 6/2005 |
| KR | 1020050092637 | 9/2005 |
| KR | 1020070116513 | 12/2007 |

* cited by examiner

*Primary Examiner* — Duc Dinh
(74) *Attorney, Agent, or Firm* — Cantor Colburn LLP

(57) ABSTRACT

A timing controller for a display device includes a receiver, a first line memory, a serialization part, and first and second compensation parts. The receiver receives image data corresponding to unit pixels, and transmits the image data to the first line memory in a first order. The first line memory receives and stores the image data. The serialization part reads the image data in the first order from the first line memory and serially transmits the image data in a second order different from the first order. The first compensation part receives the image data in the second order and generates first compensation data of the image data, the first compensation data corresponding to a first gamma curve. The second compensation part receives the image data in the second order and generates second compensation data of the image data, the second compensation data corresponding to a second gamma curve.

27 Claims, 11 Drawing Sheets

TIMING CONTROLLER AND DISPLAY DEVICE INCLUDING THE SAME

BACKGROUND OF THE INVENTION

1. Field of the Invention

The present invention relates to a timing controller for a display device and a display device including the same and, more particularly, the present invention relates to a timing controller which transmits data signals without requiring additional signal lines, and a display device having the same.

2. Description of the Related Art

A liquid crystal display ("LCD") apparatus typically includes a display panel including pixels, gate lines and data lines. The pixels include switching elements and the switching elements are electrically connected to the gate lines and the data lines. The LCD apparatus further includes a gate driver for providing gate signals to the gate lines to turn the switching elements of the pixels on and off, a gray voltage generator for generating a plurality of gray voltages, a data driver for selecting a voltage corresponding to image data as a data voltage from the plurality of gray voltages and for applying the data voltage to the data lines, and a timing controller for controlling the abovementioned elements.

The gate driver and the gray voltage generator are supplied with voltages and convert them into voltages to drive the LCD apparatus. For example, the gate driver receives a gate-on voltage and a gate-off voltage and alternately applies them to the gate lines as a gate signal, and the gray voltage generator receives a uniform reference voltage and divides it with a plurality of resistors to provide divided voltages to the data driver.

Each pixel includes the switching element, connected to one of the gate lines and one of the data lines, and a liquid crystal capacitor connected to the switching element. The liquid crystal capacitor includes a pixel electrode on a lower display panel and a common electrode on an upper display panel, disposed opposite to, e.g., facing, the lower display panel. The liquid crystal capacitor further includes a liquid crystal layer interposed between the pixel electrode and the common electrode. The LCD apparatus displays a desired image by applying an electric field to the liquid crystal layer to control transmittance of light therethrough.

Because the liquid crystal layer transmits the light in a predetermined direction and the LCD apparatus displays the desired image using the light, the LCD apparatus typically has a narrow viewing angle relative to other types of display devices. To widen the viewing angle of the LCD apparatus, a vertical alignment ("VA") mode LCD apparatus has been developed. In the VA mode LCD apparatus, liquid crystal molecules of the liquid crystal layer are vertically aligned with respect to the lower display panel. Thus, when an electric field is not applied to the liquid crystal layer, the liquid crystal molecules are vertically aligned with respect to the lower display panel, and the LCD apparatus displays a black image. However, when an electric field having, a predetermined intensity, is applied to the liquid crystal layer, the liquid crystal molecules are horizontally aligned with respect to the lower display panel, and the LCD apparatus displays a white image. In addition, when an electric field having an intensity less than the predetermined intensity is applied to the liquid crystal layer, the liquid crystal molecules are inclined between vertical and horizontal with respect to the lower display panel, and the LCD apparatus thereby displays a gray image.

To further widen the viewing angle of the VA mode LCD apparatus, a patterned vertical alignment ("PVA") mode LCD apparatus has been developed. Pixels of the PVA mode LCD apparatus include a patterned common electrode and patterned pixel electrode to form multiple domains of the liquid crystal molecules. In addition, a super-PVA ("SPVA") mode LCD apparatus has been developed. In the SPVA mode LCD apparatus, each pixel includes several sub-pixels, and different voltages are applied to each sub-pixel in accordance with different gamma curves.

The LCD apparatus typically employs an accurate color capture ("ACC") technology to improve image quality. The ACC technology improves image quality of the LCD apparatus by using a lookup table which stores compensation data for image data received from an external graphic device.

The ACC technology may be applied to the LCD apparatus having the SPVA mode. More specifically, when the ACC technology, based on a single lookup table, is employed in the SPVA mode LCD apparatus, the ACC technology is applied to sub-pixels which receives different pixel voltages according to the different gamma curves. In contrast, when the ACC technology, having more than one lookup table, is employed in the SPVA mode LCD apparatus, different ACC technologies, each based on a different lookup table, are applied to sub-pixels, which thereby receive different pixel voltages according to the different gamma curves.

BRIEF SUMMARY OF THE INVENTION

Exemplary embodiments of the present invention provide a timing controller for a liquid crystal display and a driving method to transmit data signals without requiring additional signal lines.

A display apparatus according to an exemplary embodiment of the present invention includes a display panel, a timing controller and a data driver.

The display panel includes gate lines, data lines and unit pixels. The gate lines are disposed along a first direction and the data lines are disposed along a second direction substantially perpendicular to the first direction. The unit pixels are disposed in rows along the first direction and columns along the second direction, and are electrically connected to the gate lines and data lines. Each unit pixel includes a first sub-pixel and a second sub-pixel.

The timing controller includes a receiver which receives a plurality of image data, each image data of the plurality of image data corresponding to one of the unit pixels, transmits the input image data in a first order. The timing controller further includes a first line memory which receives the image data in the first order from the receiver and stores the image data in the first order. The timing controller further includes a serialization part which reads the image data in the first order from the first line memory and serially transmits the image data in a second order different from the first order. The timing controller further includes a first compensation part which receives the image data in the second order and generates first compensation data of the image data, the first compensation data corresponding to a first gamma curve, and a second compensation part which receives the image data in the second order and generates second compensation data of the image data, the second compensation data corresponding to a second gamma curve.

The data driver receives the first compensation data and the second compensation data from the timing controller and converts the first compensation data and the second compensation data to a first grayscale data and a second gray scale data, respectively.

The first grayscale data and the second gray scale data is transmitted to the unit pixels by the data lines.

When the first grayscale data is transmitted to the first sub-pixel, the second grayscale data is transmitted to the second sub-pixel. Conversely, when the first gray scale data is transmitted to the second sub-pixel, the second grayscale data is transmitted to the first sub-pixel.

The first sub-pixel is electrically connected to a first gate line of the gate lines and a first data line of the data lines, and the second sub-pixel pixel is electrically connected to a second gate line of the gate lines and the first data line. The second gate line is adjacent to the first gate line. The first grayscale data is transmitted to the first sub-pixel through the first data line when the first sub-pixel is turned on by the first gate signal, and the second grayscale data is transmitted to the second sub-pixel through the first data line when the second sub-pixel is turned on by the second gate signal.

The first compensation part includes a first lookup table having an offset value of the first compensation data sampled from the first gamma curve and corresponding to the first grayscale data. The second compensation part includes a second lookup table having an offset value of the second compensation data sampled from the second gamma curve and corresponding to the second grayscale data.

The unit pixels of a given row are arranged along the first direction corresponding to the first order in which the receiver receives the image data.

The data driver includes source drivers, and the first line memory includes sub line memories.

The image data in the first order is divided into data groups, and the image data included in an Nth data group (where N is a natural number) of the data groups is stored in an Nth sub line memory of the first line memory. Each of Nth data groups includes the image data.

The image data in the second order includes Mth image data (where M is a natural number) of each of the Nth data groups. An Mth image data of an Nth data group is adjacent to an Mth image data of an (N−1)th data group.

The timing controller further includes a first de-serialization part which receives the first compensation data corresponding to the Mth image data of each of the Nth data groups and transmits the Mth image data of each of the Nth data groups in parallel.

The timing controller further includes a transmitter which receives the Mth image data of each of the Nth data groups and transmits the Mth image data of each of the Nth data groups to an Nth source driver of the data driver.

A method for driving a display device according to an alternative exemplary embodiment includes: receiving a plurality of image data, each image data of the plurality of image data corresponding to a unit pixel; transmitting the input image data in a first order; storing the image data in the first order in a first line memory; serially transmitting the image data stored in the first line memory in a second order different from the first order; generating first compensation data of the image data, the first compensation data corresponding to a first gamma curve; generating second compensation data of the image data, the second compensation data corresponding to a second gamma curve; converting the first compensation data and the second compensation data to a first grayscale data and a second gray scale data, respectively; and transferring the first grayscale data and the second gray scale data to the unit pixels with the data lines.

The transferring the first grayscale data and the second gray scale data includes transferring first grayscale data to one of the first sub-pixel and second sub-pixel, and transferring the second gray scale data to another of the one of first sub-pixel and the second sub-pixel.

The first sub-pixel is electrically connected to a first gate line of the display device and a first data line of the display device, and the second sub-pixel pixel is electrically connected to a second gate line of the display device and the first data line. The second gate line is adjacent to the first gate line.

The transferring the first grayscale data and the second gray scale data includes transferring the first grayscale data to a first sub-pixel of the display device through the first data line when the first sub-pixel is turned on by a first gate signal and transferring the second grayscale data to a second sub-pixel of the display device through the first data line when the second sub-pixel is turned on by a second gate signal.

The storing the image data in the first order in the first memory includes dividing the image data in the first order into data groups, and storing the image data included in an Nth data group of the data groups in the first line memory. Each of the Nth data groups includes image data.

The transmitting the image data stored in the first line memory in the second order includes arranging Mth image data of each of the Nth data groups in a line, and an Mth image data of an Nth data group is adjacent to an Mth image data of an (N−1)th data group.

The method for driving the display device further includes transmitting the Mth image data of each of the Nth data groups in parallel.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1A:
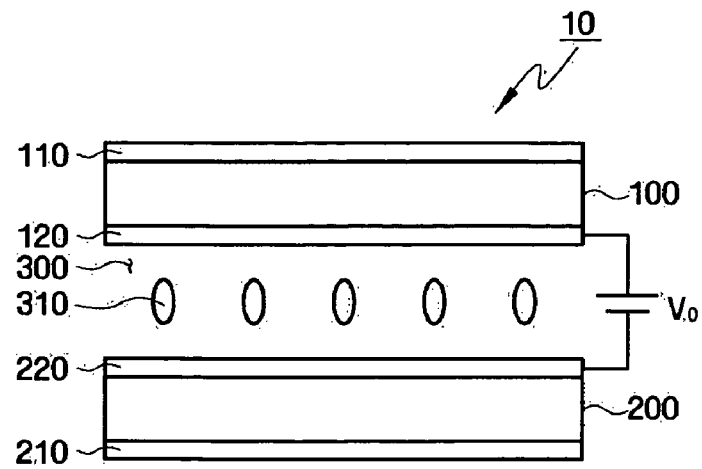
FIGS. 1A-1C are partial cross-sectional views of an exemplary embodiment of a liquid crystal capacitor according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments will be described in further detail with reference to the accompanying drawings.

Figure 1B:
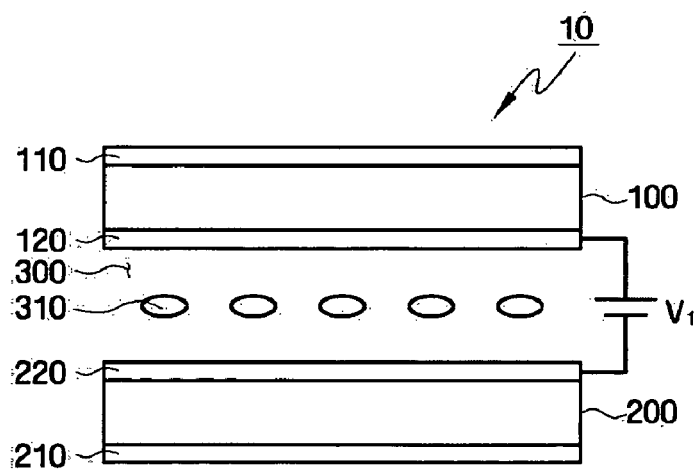
Figure 1C:
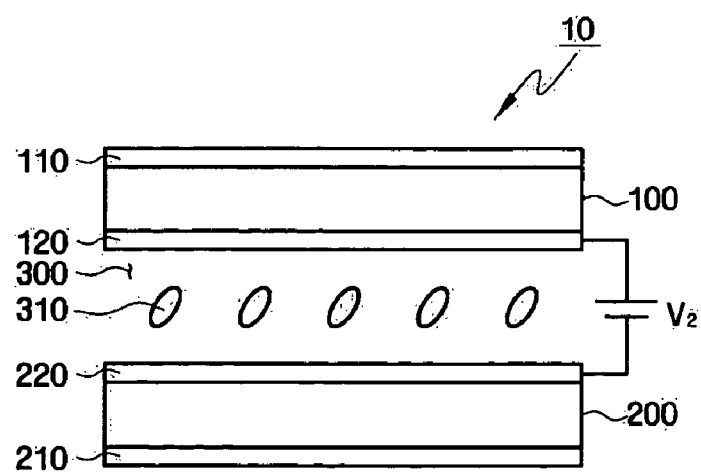

FIGS. 1A-1C are partial cross-sectional views of an exemplary embodiment of a liquid crystal capacitor of a display apparatus according to the present invention. A liquid crystal capacitor 10 includes a first electrode 120 attached to a first side of a first substrate 100 and a second electrode 220 attached to a first side of a second substrate 200. In an exemplary embodiment, the first electrode 120 and the second electrode 220 are facing each other, e.g., are disposed opposite to each other. A vertically alignment ("VA") liquid crystal layer 300 is interposed between the first electrode 120 and the second electrode 220 and functions as a dielectric layer. A first polarizer 110 is attached to an opposite second side of the first substrate 100 and a second polarizer 210 is attached to an opposite second side of the second substrate 200. An absorption axis of the first polarizer 110 and an absorption axis of the second polarizer 210 make an angle of about 90 degrees. The first electrode 120 and the second electrode 220 receive bias voltages, and an electric field is thereby generated between the first electrode 120 and the second electrode 220. The electric field is applied to the liquid crystal layer 300.

An alignment of liquid crystal molecules 310 of the liquid crystal layer 300 varies in response to the electric field applied to the liquid crystal layer 300. As shown in FIG. 1A, the liquid crystal molecules 310 of the liquid crystal layer 300 are vertically aligned with respect to the second substrate. A voltage difference $V_0$ between the first electrode 120 and the second electrode 220 is substantially equal to zero. Thus, an electric field is not applied to the liquid crystal layer 300, and the liquid crystal molecules 310 are substantially vertically aligned with respect to the second substrate 200. As a result, a relatively small amount of a light, provided from a light source (not shown) is transmitted through the liquid crystal capacitor 10. As shown in FIG. 1B, however, when a voltage difference $V_1$, having a predetermined intensity greater that zero, exists between the first electrode 120 and the second electrode 220, an electric field is applied to the liquid crystal layer 300 according to the voltage difference $V_1$, and the liquid crystal molecules 310 are horizontally aligned with respect to the second substrate 200. As a result, a relatively large amount of the light is transmitted through the liquid crystal capacitor 10. As shown in FIG. 1C, when a voltage difference between the first electrode 120 and the second electrode 220 is $V_2$, having a value greater than $V_0$ but less than $V_1$ and an electric field having an intensity smaller than the predetermined intensity, is applied to the liquid crystal layer 300, the liquid crystal molecules 310 are inclined between horizontally and vertically with respect to the second substrate 200, and an amount of light transmitted through the liquid crystal molecules 310 is smaller than that of the case shown in FIG. 1B and larger than that of the case shown in FIG. 1A.

Figure 2:
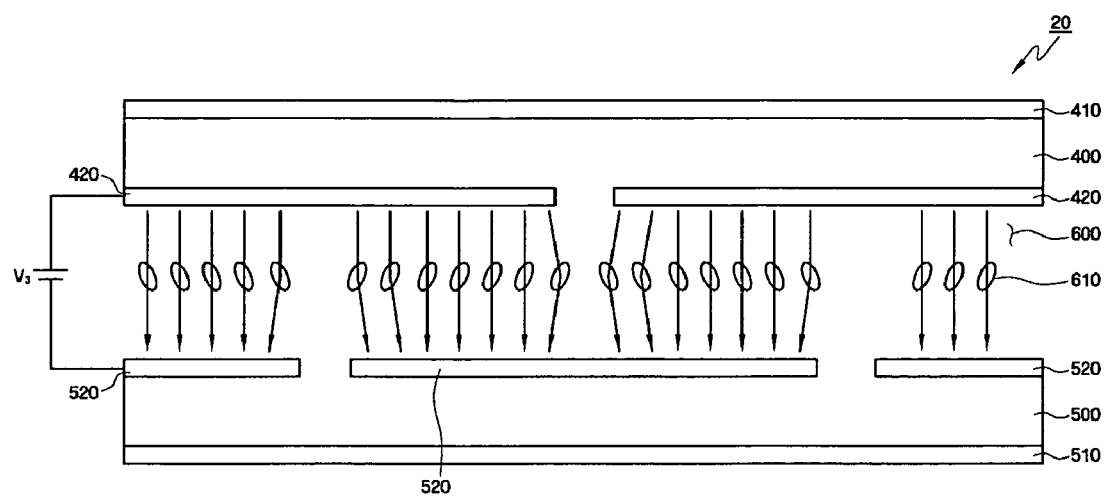
FIG. 2 is a partial cross-sectional view of an exemplary embodiment of a liquid crystal capacitor according to the present invention.

FIG. 2 is a partial cross-sectional view of an exemplary embodiment of a liquid crystal capacitor according to the present invention. Referring the FIG. 2, a liquid crystal capacitor 20 includes a third electrode 420 attached to a first side of a third substrate 400 and a fourth electrode 520 attached to a first side of a fourth substrate 500. In an exemplary embodiment, the third electrode 420 and a fourth electrode 520 are facing each other, as shown in FIG. 2. The third electrode 420 and the fourth electrode 520 each include patterned electrodes. A patterned vertically alignment ("PVA") liquid crystal layer 600 is interposed between the third electrode 420 and a fourth electrode 520 and functions as a dielectric layer. In an exemplary embodiment, the liquid crystal for PVA mode may be substantially the same as the liquid crystal layer for VA mode. A third polarizer 410 is attached to an opposite second side of the third substrate 400 and a fourth polarizer 510 is attached to an opposite second side of the second substrate 500. An absorption axis of the third polarizer 410 and an absorption axis of the fourth polarizer 510 make an angle of about 90 degrees.

As shown FIG. 2, a voltage $V_3$ is applied between the third electrode 420 and the fourth electrode 520. As a result, an electric field according to the voltage $V_3$ is applied to a liquid crystal layer 600 and liquid crystal molecules 610 therein are inclined with respect to the fourth substrate 500 based on the electric field. The third electrode 420 and the fourth electrode 520 include patterned electrodes, and the liquid crystal molecules 610 may therefore be inclined in more than one different direction. Thus light is transmitted through the liquid crystal molecules 610 in various directions, and a viewing angle of the display apparatus is thereby substantially increased.

Figure 3:
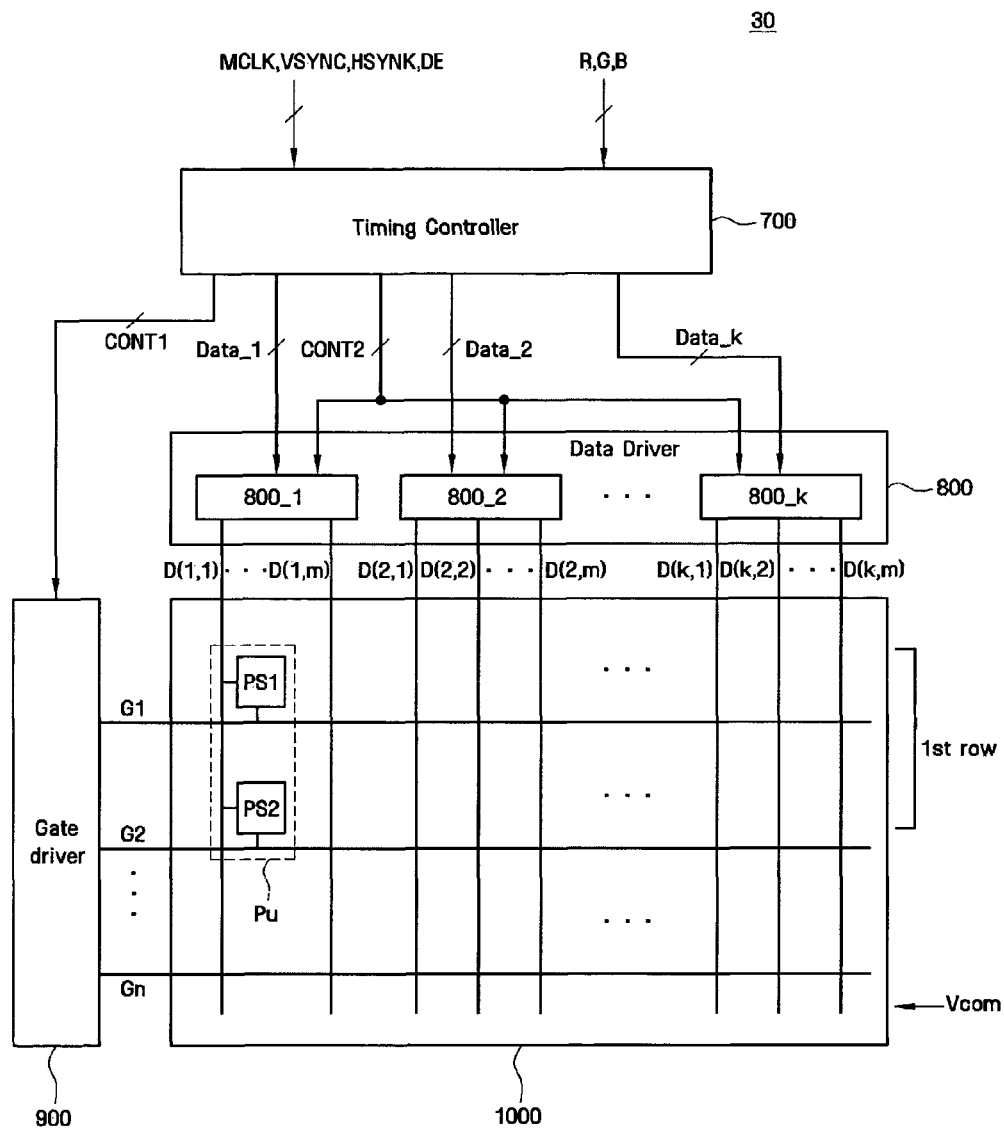
FIG. 3 is a block diagram of an exemplary embodiment of a display apparatus according to the present invention.
Figure 4:
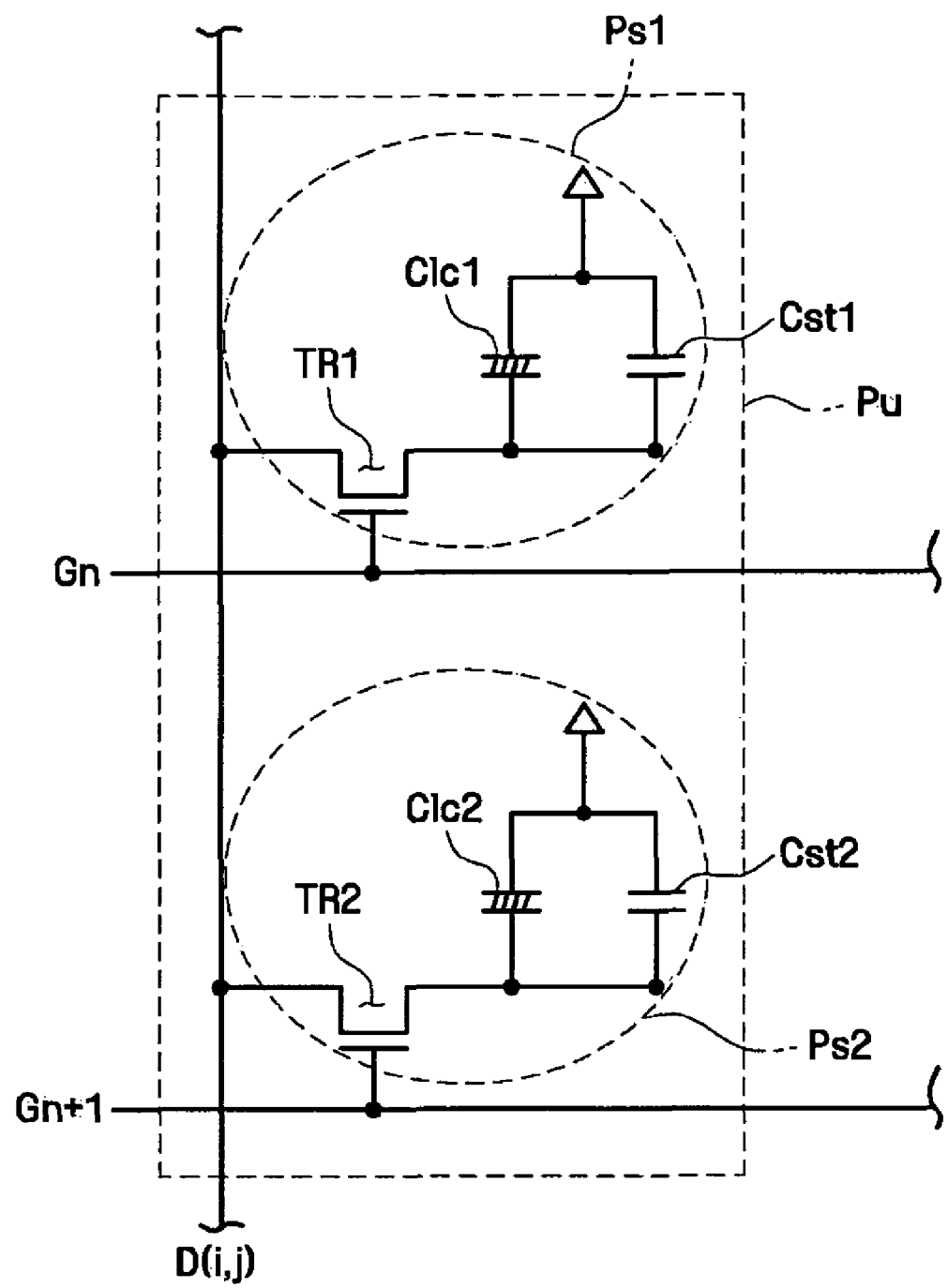
FIG. 4 is an equivalent schematic circuit diagram of an exemplary embodiment of a unit pixel of the display apparatus shown in FIG. 3.

FIG. 3 is a block diagram of an exemplary embodiment of a display apparatus according to the present invention, and FIG. 4 is an equivalent schematic circuit diagram of an exemplary embodiment of a unit pixel of the display apparatus shown in FIG. 3. A display apparatus 30 may include a super-PVA ("SPVA") mode liquid crystal and an accurate color capture ("ACC") technology may be utilized in the display apparatus 30 to substantially improve image quality thereof Referring to FIGS. 3 and 4, the display apparatus 30 according to an exemplary embodiment includes a timing controller 700, a data driver 800, a gate driver 900 and a display panel 1000.

Referring to FIG. 3, the display panel 1000 includes a plurality of signal lines G1-Gn and D(1,1)-D(k,m), and a plurality of unit pixels Pu connected to the plurality of signal lines G1-Gn and D(1,1)-D(k,m). Unit pixels Pu of the plurality of unit pixels Pu are arranged in a substantially matrix pattern. The plurality of signal lines G1-Gn and D(1,1)-D(k,m) include data lines D(1,1)-D(k,m) for delivering data signals and gate lines G1-Gn for delivering gate signals (also referred to as scan signals). The gate lines G1-Gn extend in a substantially row direction and are substantially parallel to each other, while the data lines D(1,1)-D(k,m) extend in a substantially column direction and are substantially parallel to each other, as shown in FIG. 3.

The display panel 1000 includes the plurality of unit pixels Pu. Each of the unit pixels Pu includes a first sub-pixel Ps1 and a second sub-pixel Ps2. The first sub-pixel Ps1 receives a first gate signal through a gate line Gn of the gate lines G1-Gn and is electrically connected to a data line D(i,j) of the data lines D(1,1)-D(k,m). The second sub-pixel Ps2 receives a second gate signal through a second gate line Gn+1 adjacent to the first gate line Gn and is electrically connected to the data line D(i,j).

The first sub-pixel Ps1 includes a first switching element TR1, a first liquid crystal capacitor Clc1 and a first storage capacitor Cst1. The first switching element TR1 may be a three-terminal element, such as a thin film transistor ("TFT"), for example. A control terminal of each of the first switching devices TR1 is connected to one of the gate lines G1-Gn, an input terminal thereof is connected to one of the data lines D(1,1)-D(k,m), and an output terminal thereof is connected to one of the first liquid crystal capacitors Clc1 and one of the first storage capacitors Cst1.

The second sub-pixel Ps2 includes a second switching element TR2, a second liquid crystal capacitor Clc2 and a second storage capacitor Cst2. The second switching element TR2 may be a three-terminal element, such as a TFT, for example. A control terminal of the second switching device TR2 is connected to another one of the gate lines G1-Gn, an input terminal thereof is connected to another one of the data lines D(1,1)-D(k,m), and an output terminal thereof is connected to one of the second liquid crystal capacitors Clc2 and one of the second storage capacitors Cst2.

The gate driver 900 is connected to the gate lines G1-Gn of the display panel 1000 and generates a gate-on voltage and a gate-off voltage as gate signals, which are applied to the gate lines G1-Gn.

The data driver 800 is connected to the data lines D(1,1)-D(k,m) of the display panel 1000, and selects gray voltages supplied from a gray voltage generator (not shown) and then applies the gray voltages to the data lines D(1,1)-D(k,m) as data voltages. The data driver 800 according to an exemplary embodiment includes source drivers 800_k, and each source driver 800_k receives image signals Data_k from the timing controller 700. The source drivers 800_k are electrically connected to corresponding data lines D(k,1)-D(k,m), and apply data voltages to the corresponding data lines D(k,1)-D(k,m). Each source driver 800_k applies the data voltages to the data lines D(k,1)-D(k,m) according to a data control signal CONT2 transmitted to the source drivers 800_k from the timing controller 700, and the data voltages are thereafter transmitted to the unit pixels Pu.

The timing controller 700, the data driver 800 and the gate driver 900 may be directly mounted as at least one integrated circuit ("IC") chip on the display panel 1000 or, alternatively, on a flexible printed circuit film (not shown) in a tape carrier package ("TCP") type mounting attached to the display panel 1000, or may also be mounted on a separate printed circuit board ("PCB") (not shown). Alternatively, the timing controller 700, the data driver 800 and the gate driver 900 may be integrated with the display panel 1000 along with the plurality of signal lines G1-Gn and D(1,1)-D(k,m) and the first switching element TR1 and the second switching element TR2 of the unit pixel Pu. Further, the timing controller 700, the data driver 800 and the gate driver 900 may be integrated as a single chip. However, when the timing controller 700, the data driver 800 and the gate driver 900 are integrated as a single chip, at least one of them or at least one circuit device thereof may be located outside the single chip.

An operation of the display apparatus according to an exemplary embodiment will now be described in further detail with reference to FIGS. 3-6. As shown in FIG. 3, the timing controller 700 receives input image data R, G and B and input control signals for controlling a display thereof from an external graphics controller (not shown). The input image data R, G and B contain luminance information for each unit pixel Pu. The luminance information has a predetermined number of grays, such as 1024 ($=2^{10}$), 256 ($=2^8$) or 64 ($=2^6$), for example, but alternative exemplary embodiments are not limited thereto. The input image data R, G and B and the input control signals according to an exemplary embodiment may be signals based on low voltage differential signaling ("LVDS") mode. Moreover, the input control signals include, for example, a vertical synchronization signal Vsync, a horizontal synchronization signal Hsync, a main clock signal MCLK and a data enable signal DE. The timing controller 700 processes the input image signals R, G and B based on operating conditions of the display panel 1000 according to the LVDS mode input image signals R, G and B and the input control signal. The timing controller 700 generates the image signals Data_k, a gate control signal CONT1 and a data control signal CONT2, for example, and sends the gate control signal CONT1 to the gate driver 900, and the data control signal CONT2 and the image signals Data_k to the data driver 800.

In an exemplary embodiment, the gate control signal CONT1 includes a scan start signal for indicating a scan start, and at least one clock signal for controlling an output period of the gate-on voltage. The gate control signal CONT1 may further include an output enable signal for limiting a duration of the gate-on voltage.

The data control signal CONT2 includes a horizontal synchronization start signal for indicating initiation of transmission of the image signals Data_k to the data driver 800, a load signal for requesting application of analog data voltages to the data lines D(1,1) to D(k,m) and a data clock signal. The data control signal CONT2 may further include a reverse signal for inverting a voltage polarity of the data signal with respect to a common voltage Vcom (hereinafter referred to as a "polarity of the data signal").

The data driver 800 according to an exemplary embodiment includes the source drivers 800_k, and each source driver 800_k receives a corresponding image signal of the image signals Data_k. The data driver 800 selects gray voltages corresponding to each image signal Data_k to generate analog data voltages. The data driver 800 applies the analog data voltages to corresponding data lines of the data lines D(1,1) to D(k,m).

The gate driver 900 applies the gate-on voltage to the gate lines G1 to Gn according to the gate control signal CONT1 transmitted from the timing controller 700 to turn on switching elements connected to the gate lines G1 to Gn, and the data voltages applied to the data lines D(1,1) to D(k,m) are thereby applied to corresponding unit pixels Pu through the turned-on switching elements.

A voltage difference between the data voltage applied to the unit pixels Pu and the common voltage Vcom appears as a charged voltage of the first liquid crystal capacitor Clc1 or the second liquid crystal capacitor Clc2, respectively, e.g., a pixel voltage. Alignment of the liquid crystal molecules thereby varies according to the magnitude of the pixel voltage to change a polarization of light passing through the liquid crystal layer. As described in greater detail above, the transmittance of light is changed by a polarizer attached to the display panel 1000 according to the change in the polarization such that the pixels display the luminance corresponding to grays, e.g., gray levels, of the image signals Data_k.

One horizontal period ("1H") is substantially the same as one period of the horizontal synchronization signal Hsync and the data enable signal, and the aforementioned operations are repeatedly performed to sequentially apply the gate-on voltages on to all the gate lines G1 to Gn, so that the data signals are applied to all the unit pixels Pu. As a result, one frame of a desired image is displayed. As described above, the unit pixel Pu includes the first sub pixel Ps1 and the second sub pixel Ps2. As shown in FIG. 4, the first sub-pixel Ps1 is electrically connected to an nth gate line Gn and the second sub-pixel Ps2 is connected to an (n+1)th gate line Gn+1, and the first sub-pixel Ps1 and the second sub-pixel Ps2 are commonly connected to the data line D(i,j). Therefore, in the 1H period, the gate line Gn and the gate line Gn+1 sequentially turn on the sub-pixel Ps1 and the sub-pixel Ps2, respectively.

As a result, the unit pixel Pu is charged by an analog data voltage of the data line D(i,j) for 1H.

When one frame 1H ends, the next frame starts, and of the reverse signal applied to the data driver 800 is controlled so that a polarity of the data voltages applied to each of the unit pixels Pu is reversed each frame, e.g., is opposite to a polarity in the previous frame (hereinafter referred to as "frame inversion"). In an alternative exemplary embodiment, the polarity of the data voltage sent to one data line may be inverted (row inversion and/or dot inversion). In addition, the polarities of the data voltages applied to one pixel row may be different from each other (e.g., column inversion and dot inversion).

Figure 5:
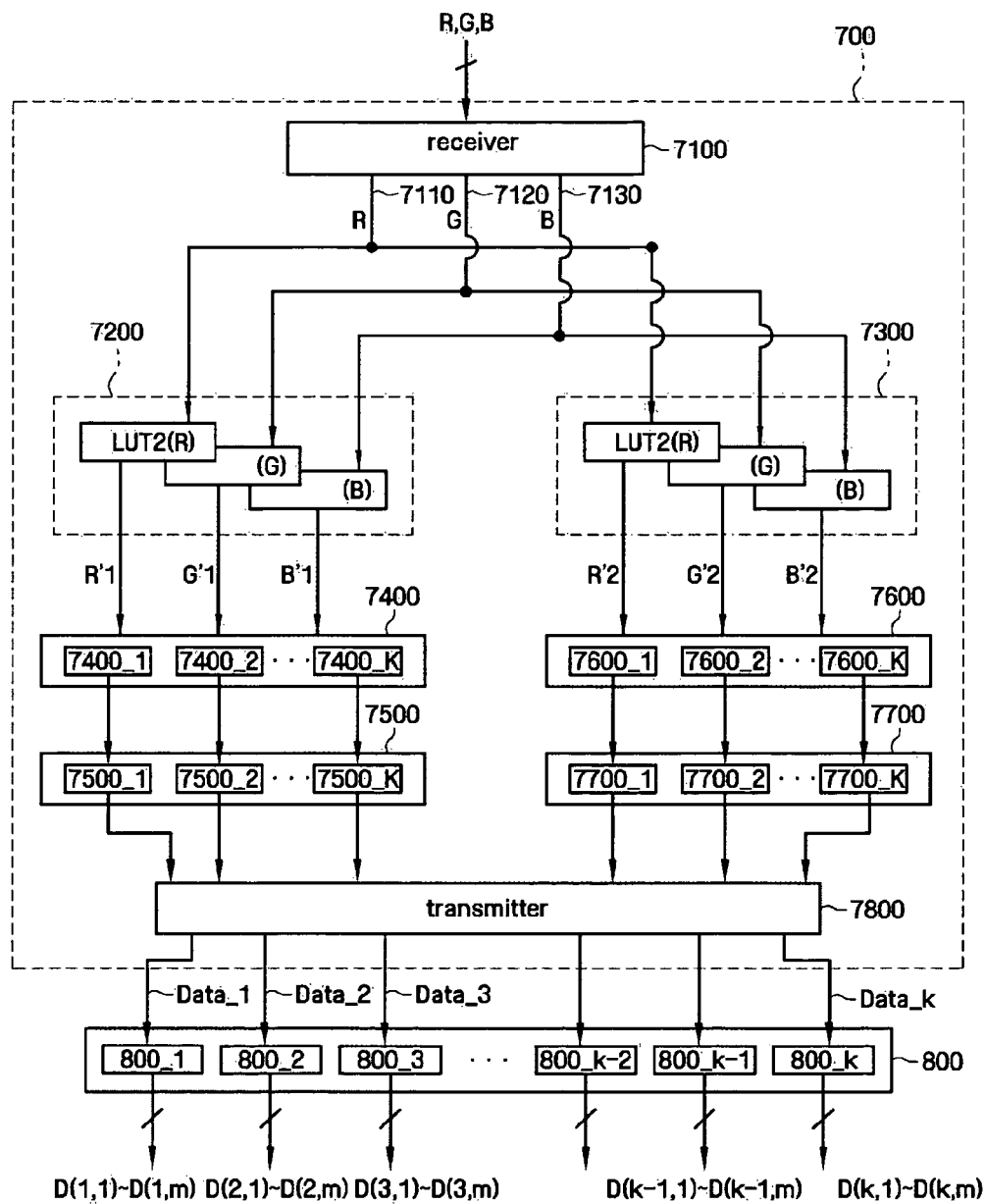
FIG. 5 is a block diagram of an exemplary embodiment of a timing controller according to the present invention.

FIG. 5 is a block diagram of an exemplary embodiment of a timing controller according to the present invention. The timing controller 700 includes a receiver 7100, a first compensation part 7200, a second compensation part 7300, a first line memory 7400, a second line memory 7500, a third line memory 7600, a fourth line memory 7700 and transmitter 7800.

The timing controller 700 receives the input image data R, G and B from an external device (not shown). The image data R is data for red pixels, the image data G is data for green pixels and the image data B is data for blue pixels. The timing controller 700 receives input image data R, G and B corresponding to unit pixels Pu of one horizontal row in the display panel 1000 during an active period, and receives no input image data during a blanking period. The active period and the blanking period occur in substantially 1H. As a resolution of a display panel is increased, a required amount of input image data R, G, and B is also increased. As a result, the timing controller 700 may receive the input image data R, G, and B through more than three channels, such as four channels or five channels to receive a greater amount of input image data R, G, and B in a fixed time, e.g., 1H. When the timing controller 700 receives the input image data R, G, and B through four channels or, alternatively, more than four channels, one of the channels may transfer the input image data for red pixels, green pixels and blue pixels together. The receiver 7100 divides the input image data for red pixels, green pixels and blue pixels into the input image data R, G and B, respectively, and transmits the data to a first channel 7110, a second channel 7120 and a third channel 7130, respectively, as shown in FIG. 5.

Figure 6:
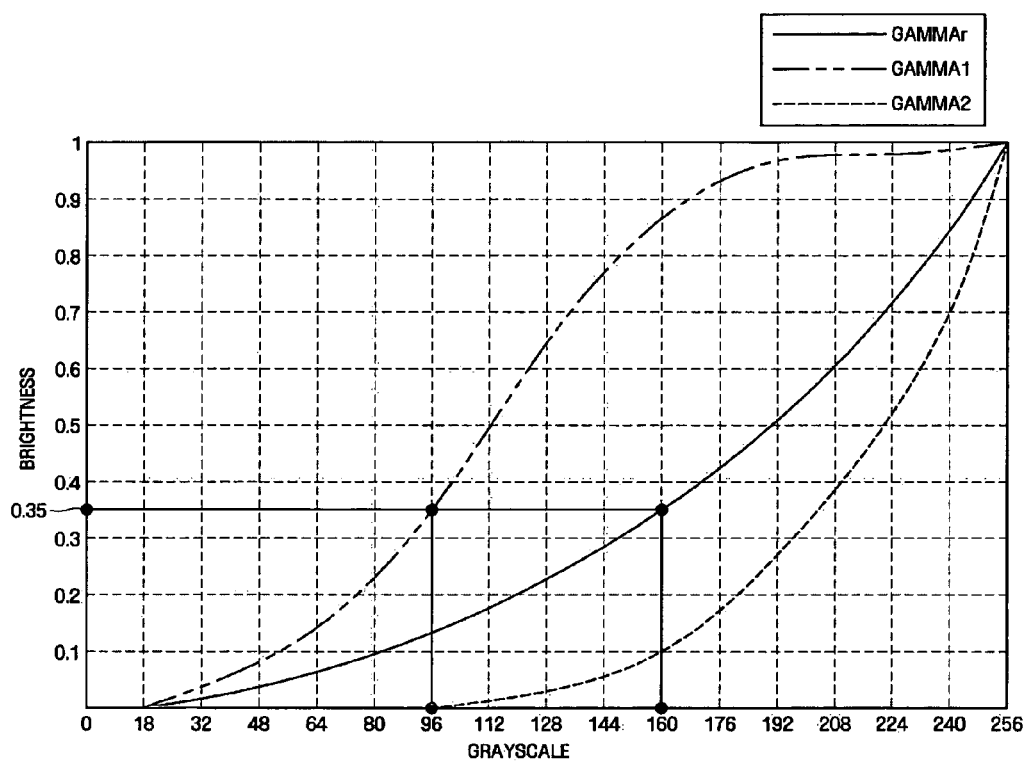
FIG. 6 is a graph of brightness versus grayscale illustrating an exemplary embodiment of a gamma curve applied to first compensation data and second compensation data according to the present invention.

FIG. 6 is a graph of brightness versus grayscale illustrating an exemplary embodiment of a gamma curve applied to first compensation data and second compensation data according to the present invention. Referring FIGS. 5 and 6, the timing controller 7000 includes the first compensation part 7200 and the second compensation part 7300. The first compensation part 7200 and the second compensation part 7300 receive the input image data R, G and B from the receiver 7100. The first compensation part 7200 generates first compensation data R'1, G'1 and B'1, for compensating the input image data R, G and B, using a first gamma curve GAMMA1, and the second compensation part 7300 generates second compensation data R'2, G'2 and B'2, for compensating the input image data R, G and B, by using a second gamma curve GAMMA2.

More particularly, as shown in FIG. 6, the x-axis refers to a grayscale value of the input image data R, G and B and the y-axis refers to a brightness or a transmittance. A reference gamma curve GAMMAr represents a gamma curve optimized for front visibility and the first gamma curve GAMMA1 and the second gamma curve GAMMA2 represent gamma curves optimized for side visibility, for example.

As a result, the display apparatus according to an exemplary embodiment provides a substantially widened viewing angle to a viewer.

The first compensation part 7200 applies gray voltages of the input image data R, G and B to the first gamma curve GAMMA1 to generate the first compensation data R'1, G'1 and B'1. The first compensation part 7200 includes a first lookup table in which offset values of the first compensation data R'1, G'1 and B'1, sampled from the first gamma curve, are stored. The first lookup table includes sub lookup tables LUT1(R), LUT1(G) and LUT1(B) for red input image data R, green input image data G and blue input image data B, respectively. The first lookup table may be an electrically erasable programmable read only memory ("EEPROM") or other type of non-volatile memory device, for example. The grayscale data corresponding to the input image data R, G and B is converted to corresponding brightness or transmittance values based on the first gamma curve GAMMA1, and the converted brightness or transmittance are converted to the first compensation data R'1, G'1 and B'1 based on the reference gamma curve GAMMAr. A difference between the first compensation data R'1, G'1 and B'1 and the grayscale data of the input image data R, G and B is the offset value, and the offset value is stored in the first lookup table. Thus, the first compensation part 7200 converts the input image data R, G and B to the first compensation data R'1, G'1 and B'1 by adding the input image data R, G and B and the offset data corresponding to the input image data R, G and B.

For example, as shown in FIG. 6, a grayscale data corresponding to an input image data R, G and B is 96. Referring the first gamma curve GAMMA1, the gray scale value 96 is converted to a brightness value of 0.35 (e.g., 35%). The brightness value of 0.35 is converted to the first compensation data R'1, G'1 and B'1 having a value of 160. As a result, a difference 64 between the grayscale data 96 corresponding to one of the input image and the first sample compensation data R'1, G'1 and B'1 having a value of 160 is stored in the first lookup table as the offset value.

The second compensation part 7300 receives the input image data R, G and B from the receiver 7100. The second compensation part 7300 generates second compensation data R'2, G'2 and B'2 for compensating the input image data R, G and B by using the second gamma curve GAMMA2.

The second compensation part 7300 applies grayscale data of the input image data R, G and B to the second gamma curve GAMMA2 to generate the second compensation data R'2, G'2 and B'2. The second compensation part 7300 includes a second lookup table in which the offset value of the second compensation data, sampled from the second gamma curve, are stored. The second lookup table may include sub lookup tables LUT2(R), LUT2(G) and LUT2(B) for red input image data R, green input image data G and blue input image data B, respectively. The second lookup table may be an EEPROM or other type of non-volatile memory device, for example. The grayscale data corresponding to the input image data R, G and B is converted to a corresponding brightness or transmittance value based on the second gamma curve GAMMA2 and the converted brightness or transmittance are converted to the second compensation data R'2, G'2 and B'2 based on the reference gamma curve GAMMAr. A difference between the second compensation data R'2, G'2 and B'2 and the grayscale data of the input image data R, G and B is the offset value, and the offset value is stored in the second lookup table. Thus, the second compensation part 7300 converts the input image data R, G and B to the second compensation data R'2, G'2 and B'2 by adding the input image data R, G and B and the offset data corresponding to the input image data R, G and B.

The first line memory 7400 receives the first compensation data R'1, G'1 and B'1 corresponding to unit pixels Pu of a current row and sequentially stores the first compensation data R'1, G'1 and B'1 from the first compensation data of the first unit pixel Pu of the current row to the first compensation data of a last unit pixel Pu of the current row. The first line memory 7400 may be synchronous dynamic random access memory ("SDRAM"), but alternative exemplary embodiments are not limited thereto. The first line memory 7400 transmits the first compensation data R'1, G'1 and B'1 corresponding to the unit pixels Pu of the current row to the second line memory 7500 and receives the first compensation data R'1, G'1 and B'1 corresponding to the unit pixels Pu of a next row. The second line memory 7500 transmits the first compensation data R'1, G'1 and B'1 of the current row to the transmitter 7800. The transmitter 7800 converts the first compensation data R'1, G'1 and B'1 of the current row to the image signals Data_1-Data_k for the first sub pixel Ps1 and outputs the image signals Data1-Data_k for the first sub pixel Ps1 to the data driver 800. The second line memory 7500 may be an SDRAM, but alternative exemplary embodiments are not limited thereto.

The third line memory 7600 receives the second compensation data R'2, G'2 and B'2 corresponding to the unit pixels Pu of the current row and sequentially stores the second compensation data R'2, G'2 and B'2 from the second compensation data R'2, G'2 and B'2 of the first unit pixel Pu of the current row and the second compensation data R'2, G'2 and B'2 of the last unit pixel Pu of the current row. The third line memory 7600 may be an SDRAM, but alternative exemplary embodiments are not limited thereto. The third line memory 7600 transmits the second compensation data R'2, G'2 and B'2 corresponding to the unit pixels Pu of the current row to the fourth line memory 7700 and receives the second compensation data R'2, G'2 and B'2 corresponding to the unit pixels Pu of the next row. The fourth line memory 7500 transmits the second compensation data R'2, G'2 and B'2 of the current row to the transmitter 7800. The transmitter 7800 converts the second compensation data R'2, G'2 and B'2 of the current row to the image signals Data_1-Data_k for the second sub pixel Ps2 and outputs the image signals Data1-Data_k for the second sub pixel Ps2 to the data driver 800. The fourth line memory 7700 may be an SDRAM, but alternative exemplary embodiments are not limited thereto). Because an SDRAM is not able to simultaneously perform reading operation and writing operation, two line cascaded line memories are required to reduce a processing time using the ACC technology. Thus, one line memory is for a writing operation and another memory is for a reading operation.

The data driver 800 converts the image signals Data_1-Data_k to analog gray voltages and outputs the analog gray voltages to the display panel 1000 through the data lines D(1,1)-D(k,m). As shown in FIG. 5, the data driver 800 may include a plurality of the source drivers 800_k, and each source driver 800_k receives the image signals Data_k from the timing controller 700. The source drivers 800_k are connected to corresponding data lines of the data lines D(k, 1)-D(k,m), and apply the gray voltages to the corresponding data lines. More specifically, the source drivers 800_k apply the gray voltages to the data lines according to the data control signal CONT2 transmitted to the source drivers 800_k from the timing controller 700, and the gray voltages are thereby transmitted to the unit pixels Pu. Each line memory may include sub line memories which are connected to the source driver 800_k. More specifically, for example, the first line memory 7400 may include sub memories 7400_1-7400_k, the second line memory 7500 may include sub memories

7500_1-7500_k, the third line memory 7600 may include sub memories 7600_1-7600_k and the fourth line memory 7700 may include sub memories 7700_1-7700_k. The sub memory 7400_k of the first line memory 7400 is connected to the sub memory 7500_k of the second line memory 7500 and the sub line memory 7500_k of the second line memory 7500 is connected to the source driver 800_k through the transmitter 7800. The sub memory 7600_k of the third line memory 7600 is connected coupled to the sub memory 7700_k of the fourth line memory 7700 and the sub memory 7700_k of the fourth line memory 7700 is connected to the source driver 800_k through the transmitter 7800. Thus, the image signal Data_k is based on data stored in sub memories 7400_k, 7500_k, 7600_k and 7700_k.

Figure 7:
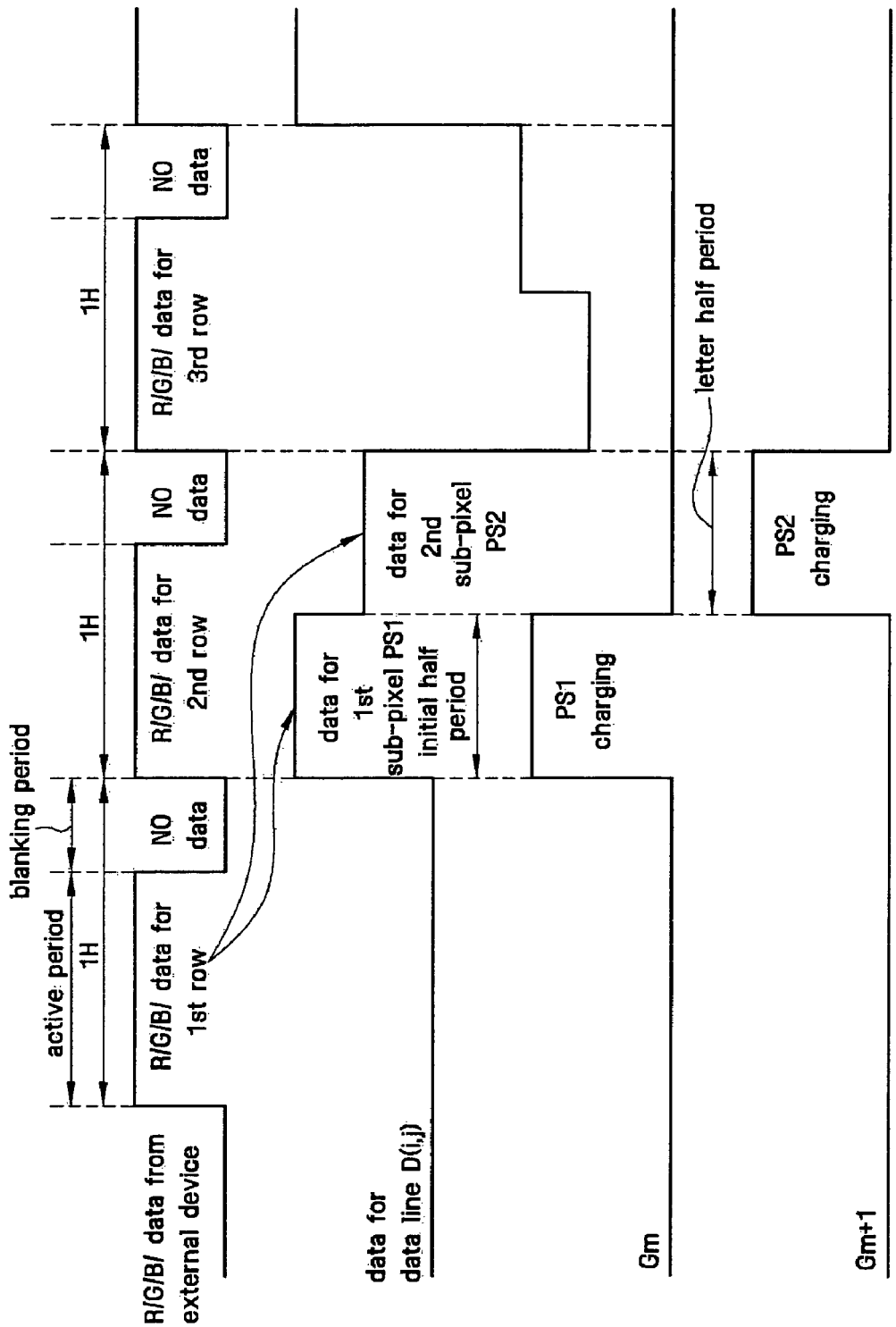
FIG. 7 is a signal timing diagram illustrating an operation of an exemplary embodiment of a timing controller according to the present invention.

FIG. 7 is a signal timing diagram illustrating an operation of an exemplary embodiment of a timing controller according to the present invention. During an initial half-period of a horizontal period 1H during which the first sub-pixel Ps1 is driven, the data driver 800 outputs an analog gray voltage corresponding to the first compensation data R'1, G'1, B'1 to the data lines D(1,1)-D(k,m). During a latter half-period of the horizontal period 1H during which the second sub-pixel Ps2 is driven, the data driver 800 outputs an analog gray voltage corresponding to the second compensation data R'2, G'2, B'2 to the data lines D(1,1)-D(k,m).

The gate driver 900 generates a gate signal using the gate control signal CONT1, received from the timing controller 700, and a gate-on voltage and a gate-off voltage, which are applied from an external device (not shown). The gate control signal CONT1 may include a scan start signal for indicating scan start, and at least one clock signal for controlling an output period of the gate-on voltage. The gate control signal CONT1 may further include an output enable signal for limiting a timing duration of the gate-on voltage. For example, the gate driver 900 may output a first gate signal, which is the gate-on voltage, to the first gate line Gn electrically connected to the first transistor TR1 of the first sub pixel Ps1 and during the initial half-period of the horizontal period 1H, and may output a second gate signal, which is also the gate-on voltage, to the second gate line Gn+1 adjacent to the first gate line Gn and electrically connected to the second transistor TR2 of the second sub pixel Ps2 during the latter half-period of the horizontal period 1H.

During the initial half-period of the horizontal period 1H, the first sub-pixel Ps1 is turned on and receives the gray voltage corresponding to the first compensation data R'1, G'1 and B'1 and, during the latter half-period of the horizontal period 1H, the second sub-pixel Ps2 is turned on and receives the gray voltage corresponding to the second compensation data R'2, G'2 and B'2. Because the first sub-pixel Ps1 and the second sub-pixel Ps2 receive the gray voltage corresponding to the first compensation data R'1, G'1 and B'1 and the second compensation data R'2, G'2 and B'2, respectively, the unit pixel Pu include multiple domains of the liquid crystal molecules 610 (FIG. 2).

In addition, the first sub-pixel Ps1 and the second sub-pixel Ps2 are charged using the first compensation data R'1, G'1 and B'1 and the second compensation data R'2, G'2 and B'2, which are color compensation data for the first gamma curve GAMMA1 and the second gamma curve GAMMA2 (FIG. 6) different from each other. Accordingly, in the first sub-pixel Ps1 and the second sub-pixel Ps2, a color coordinate value of each of colors viewed from the front of the display apparatus is substantially the same as a color coordinate value of each of the colors viewed from the side of the display apparatus.

Accordingly, the display apparatus according to an exemplary embodiment supplies a substantially improved wide viewing angle to a viewer.

Figure 8:
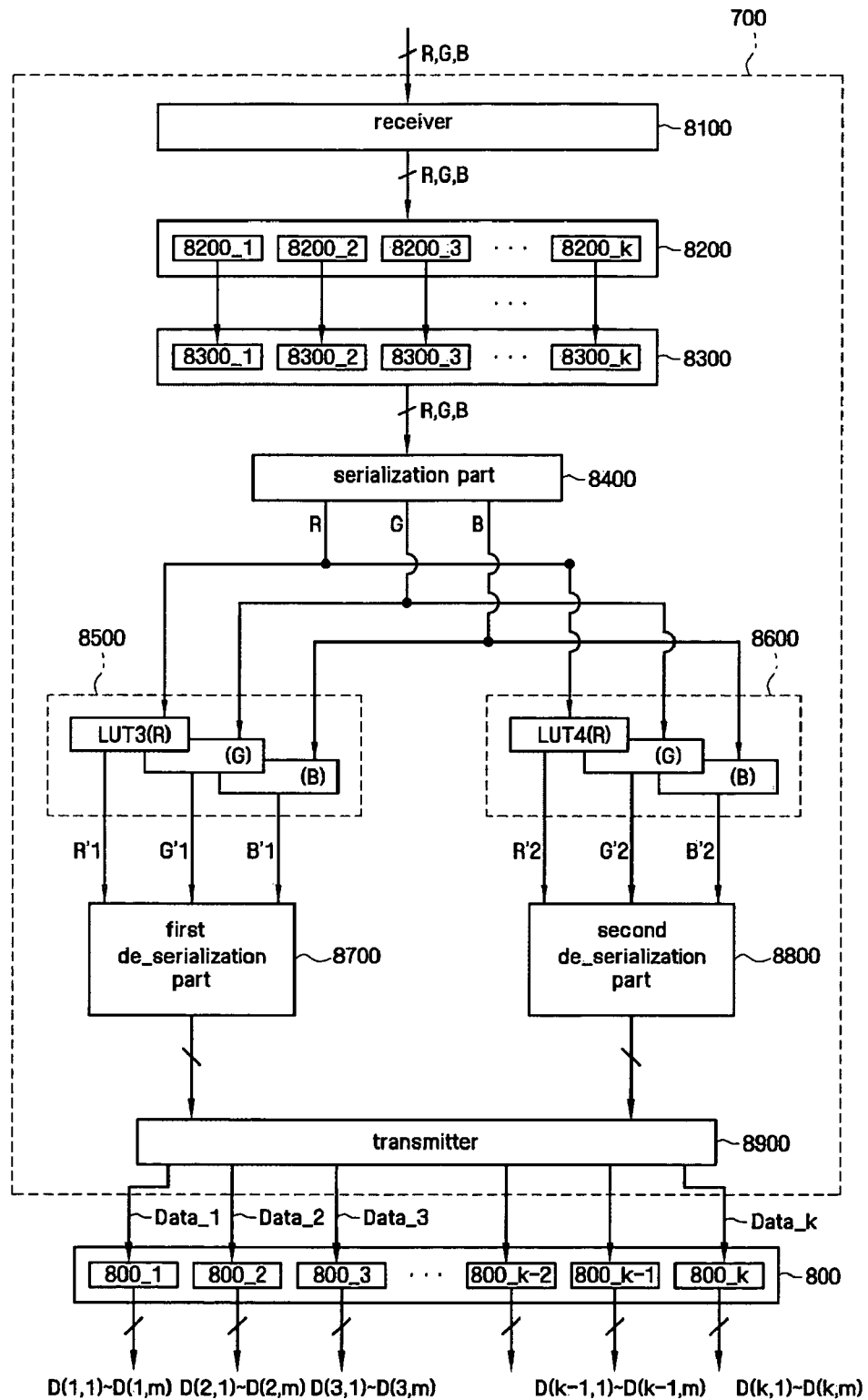
FIG. 8 is a block diagram of an alternative exemplary embodiment of a timing controller and a data driver according to the present invention.

FIG. 8 is a block diagram of an alternative exemplary embodiment of a timing controller and a data driver according to the present invention.

Referring FIG. 8, the timing controller 700 includes a receiver 8100, a fifth line memory 8200, a sixth line memory 8300, a serialization part 8400, a third compensation part 8500, a fourth compensation part 8600, a first de-serialization part 8700, a second de-serialization part 8000 and a transmitter 8900. The timing controller 700 receives input image data R, G and B from an external device (not shown) and converts the input image data R, G and B to image signals Data_1-Data_k. The image data R is data for red pixels, the image data G is data for green pixels and the image data B is data for blue pixels. A data driver 800 receives the image signals Data_1-Data_k from the timing controller 700, converts the image signals Data_1-Data_k to analog gray voltages and outputs the analog gray voltages to the display panel 1000 through the data lines D(1,1)-D(k,m).

As shown in FIG. 8, the data driver 800 may include source drivers 800_k, and each source driver 800_k receives the image signals Data_k from the timing controller 700. The source drivers 800_k are connected to corresponding data lines of the data lines D(1,1)-D(k,m), and apply gray voltages to the corresponding data lines. The source drivers 800_k apply the analog gray voltages to the data lines D(k,1)-D(k,m) according to the data control signal CONT2 transmitted to the source drivers 800_k from the timing controller 700, and the data voltages are thereby transmitted to the unit pixels Pu.

When a horizontal resolution of the display apparatus is high, a plurality of the source drivers 800_k is required. A number of output pads through which the source drivers 800_k transmit the analog gray voltages to the display panel 1000 is limited, based on an area of the source driver 800_k on which the output pads are disposed. For example, when a horizontal resolution of the display panel 1000 is 1920, 5760 (=1920×3, 3 is for one each of R, G and B) output pads of the data driver 800 are required. Moreover, when the number of the output pads of one source driver 800_k is 720, eight (=5760/720) source drivers 800_k are sufficient to drive the display panel 1000.

The timing controller 700 receives the input image data R, G and B from an external device (not shown). As described in greater detail above, the timing controller 700 receives the input image data R, G and B corresponding to unit pixels Pu of one horizontal row of the display panel 1000 during an active period and receives no input data during a blanking period. The active period and the blanking period are included in one 1H period. As a resolution of the display panel 1000 is increased, an amount of required input image data R, G, and B is also increased. Accordingly, the timing controller 700 may receive the input image data R, G, and B through more than three channels, such as through four channels or, alternatively, five or more channels to receive the required amount of input image data R, G, and B in 1H. When the timing controller 700 receives the input image data R, G and B through four channels (or more than four channels) one of the channels may transfer mixed input data for red pixels, green pixels and blue pixels. The receiver 8100 thereby divides the mixed input data for the red pixels, the green pixels and the blue pixels into separated input image data R, G, and B, respectively.

Figure 9A:
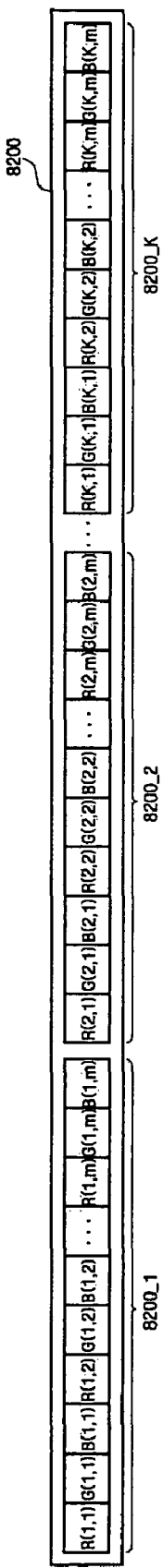
FIGS. 9A-9D are block diagrams illustrating input image data stored in an exemplary embodiment of a line memory of a timing controller according to the present invention.
Figure 9B:
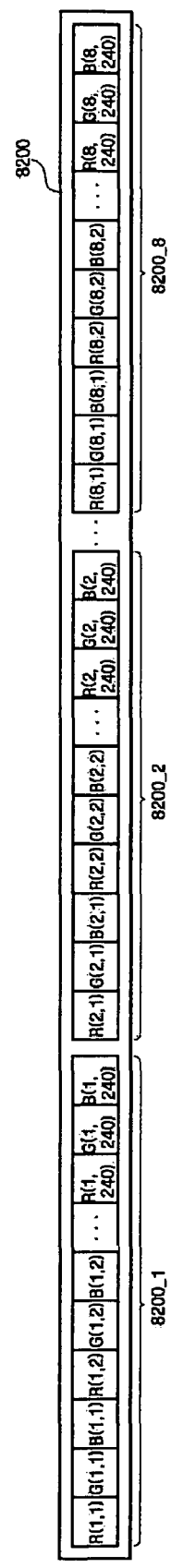

FIGS. 9A-9D are block diagrams illustrating input image data stored in an exemplary embodiment of a line memory of a timing controller according to the present invention. More particularly, FIG. 9A is a data map of the received input image data R, G and B stored in the fifth line memory 8200.

As shown in FIG. 9(*a*), the received input image data R, G and B are ordered from R(1,1),G(1,1),B(1,1) to R(k,m),G(k,m),B(k,m), where m is ⅓ of the number of the output pads included in one source driver 800_*k*, k is the number of source driver 800_*k* included in the data driver 800, and m*k is equal to the horizontal resolution of the display panel 1000. The received input image data R, G and B is stored in a first order of R(1,1),G(1,1),B(1,1) to R(k,m),G(k,m),B(k,m). In an exemplary embodiment, the fifth line memory 8200 includes k sub memories 8200_1-8200_*k*. Each of the sub memories 8200_1-8200_*k* stores data for m pixels.

As shown in FIG. 9(*b*), when the horizontal resolution of the display panel 1000 is 1920, for example, and the data driver 800 includes 8 source divers 800_1-800_8, the fifth line memory 8200 includes 8 sub memories 8200_1-8200_8 and each of the sub memories 8200_1-8200_8 stores 240 input image data for R, G and B. More particularly, the sub memory 8200_1 stores 240 input image data for R, G and B from the 1st input image data R(1,1),G(1,1),B(1,1) to the 240th input image data R(1,240), G(1,240), B(1,240), the sub memory 8200_2 stores input image data R, G and B from the 241st input image data R(2,1),G(2,1),B(2,1) to the 480th input image data R(2,240), G(2,240), B(2,240), and the sub memory 8200_8 stores input image data R, G and B from the 1680th input image data R(8,1),G(8,1), B(8,1) to the 1920th input image data R(8,240), G(8,240), B(8,240), sequentially. The fifth line memory 8200 may be an SDRAM, but alternative exemplary embodiments are not limited thereto. Because SDRAM is not able to perform reading operation and writing operation simultaneously, two line memories are required to reduce a processing time using the ACC technology. Specifically one line memory is for a writing operation and another line memory is for a reading operation. The sixth line memory 8300 may be connected to the fifth line memory 8200 and may store the input image data R, G and B. In an exemplary embodiment, an arrangement of the input image data R, G and B in the sixth line memory 8300 may be substantially the same as in the fifth line memory 8200.

Figure 9C:
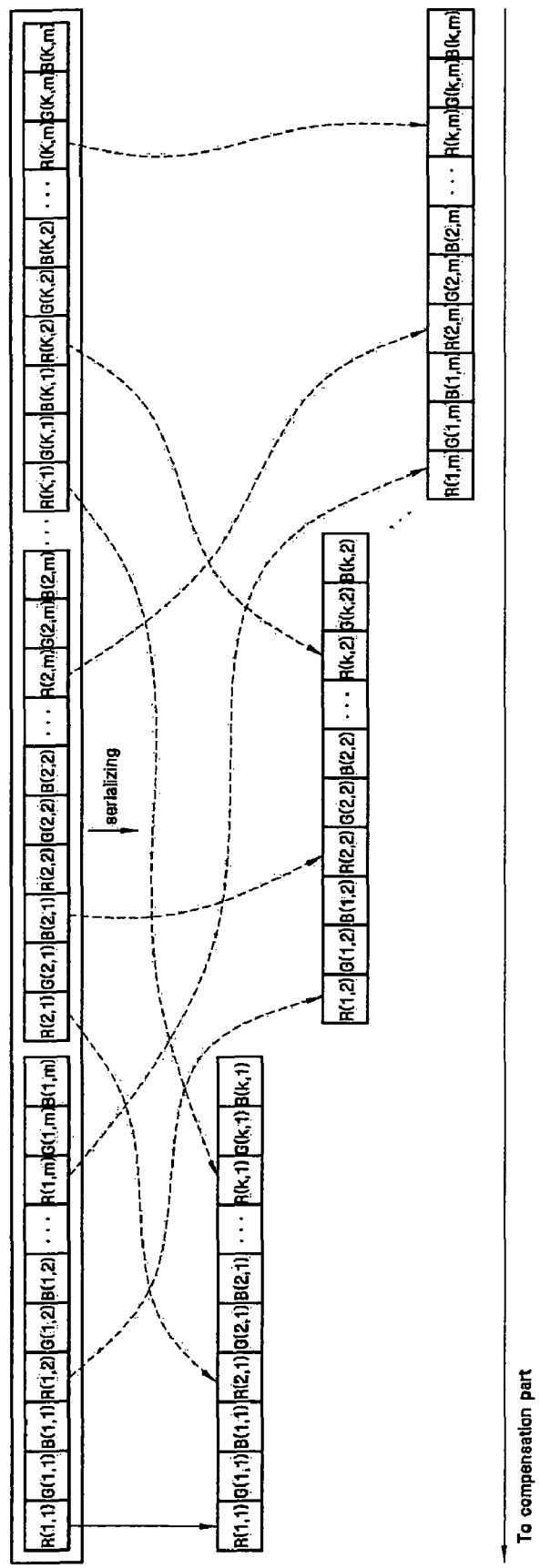

As shown FIG. 9C, the serialization part 8400 serializes the input image data R, G and B. More specifically, the serialization part 8400 reads the first data stored in the sub memories 8300_1-8300_*k* and sequentially arranges the data from the first data R(1,1)G(1,1)B(1,1), stored in sub memory 8300_1, to the first data R(k,1)G(k,1)B(k,1), stored in sub memory 8300_*k*. The serialization part 8400 then reads the second data stored in the sub memory 8300_1-8300_*k* and sequentially arranges the data from the second data R(1,2)G(1,2)B(1,2), stored in sub memory 8300_1, to the second data R(k,2)G(k,2)B(k,2), stored in sub memory 8300_*k*. The sequentially arranged first data R(1,1)G(1,1)B(1,1) to R(k,1)G(k,1)B(k,1) are sequentially followed by the sequentially arranged second data R(1,2)G(1,2)B(1,2) to R(k,2)G(k,2)B(k,2). By repeating the abovementioned steps, the input image data R, G and B are sequentially arranged from R(1,1)G(1,1)B(1,1) to R(k,m)G(k,m)B(k,m).

The sequentially arranged data R(1,1)G(1,1) B(1,1) to R(k,m)G(k,m)B(k,m) are sequentially transmitted to the third compensation part 8500 and the fourth compensation part 8600. The third compensation part 8500 generates the first compensation data R'1, G'1 and B'1 for compensating the input image data R, G and B by using the first gamma curve GAMMA1.

As described in greater detail above, in the gamma curves shown in FIG. 6, the x-axis refers to the grayscale value of input image data R, G and B and the y-axis refers to brightness or transmittance. The reference gamma curve GAMMAr represents a gamma curve optimized for front visibility, and the first gamma curve GAMMA1 and the second gamma curve GAMMA2 represent gamma curves optimized for side visibility. As a result, the display apparatus according to an exemplary embodiment provides a substantially widened viewing angle.

The third compensation part 8500 applies grayscale data from the input image data R, G and B to the first gamma curve GAMMA1 to generate the first compensation data R'1, G'1 and B'1. The third compensation part 8500 includes a third lookup table in which an offset value of the third compensation data R'1, G'1 and B'1, sampled from the first gamma curve GAMMA1, are stored. The third lookup table includes sub lookup tables LUT3(R), LUT3(G) and LUT3(B) for red input image data R, green input image data G and blue input image data B, respectively. The third lookup table may be an EEPROM or other type of non-volatile memory, but alternative exemplary embodiments are not limited thereto. The grayscale data of the input image data R, G and B is converted to a corresponding brightness or transmittance value based on the first gamma curve GAMMA1, and the brightness or transmittance are thereafter converted to the first compensation data R'1, G'1 and B'1 relative to the reference gamma curve GAMMAr. A difference between the third compensation data R'1, G'1 and B'1 and the grayscale data of the input image data R, G and B is the offset value, and the offset value is stored in the third lookup table. The third compensation part 8500 converts the input image data R, G and B to the third compensation data R'1, G'1 and B'1 by adding the input image data R, G and B to the offset data corresponding to the input image data R, G and B.

For example, as shown in FIG. 6 a grayscale data of the input image data R, G and B may be 96, for example. Referring the first gamma curve GAMMA1, the gray scale value 96 is converted to a brightness value of 0.35, e.g., 35%. The brightness value of 0.35 is converted to the third compensation data R'1, G'1 and B'1 having a value of 160 based on the reference gamma curve GAMMAr. Accordingly, the difference 64 between the grayscale data of the input image data R, G and B 96 and the third compensation data R'1, G'1 and B'1160 is stored in the first lookup table as the offset value.

The fourth compensation part 8600 generates the second compensation data R'2, G'2 and B'2 for compensating the input image data R, G and B by using the second gamma curve GAMMA2.

Specifically, the fourth compensation part 8600 applies grayscale data of the input image data R, G and B to the second gamma curve GAMMA2 to generate the second compensation data R'2, G'2 and B'2. The fourth compensation part 8600 includes a fourth lookup table in which an offset value of the second compensation data R'2, G'2 and B'2, sampled from the second gamma curve GAMMA2 and corresponding to the grayscale data of the input image data R, G and B, are stored. The fourth lookup table includes sub lookup tables LUT4(R), LUT4(G) and LUT4(B) for red input image data R, green input image data G and blue input image data B, respectively. The fourth lookup table may be an EEPROM or other type of non-volatile memory device. The grayscale data of the input image data R, G and B is converted to a corresponding brightness or transmittance value based on the second gamma curve GAMMA2, and the brightness or transmittance are thereafter converted to the second compensation data R'2, G'2 and B'2. A difference between the second compensation data R'2, G'2 and B'2 and the grayscale data of the input image data R, G and B is the offset value, and the offset value is stored in the fourth lookup table. The fourth compensation part 8600 converts the input image data R, G and B to the second compensation data R'2, G'2 and B'2 by adding the input image data R, G and B to the offset data corresponding to the input image data R, G and B.

Figure 9D:
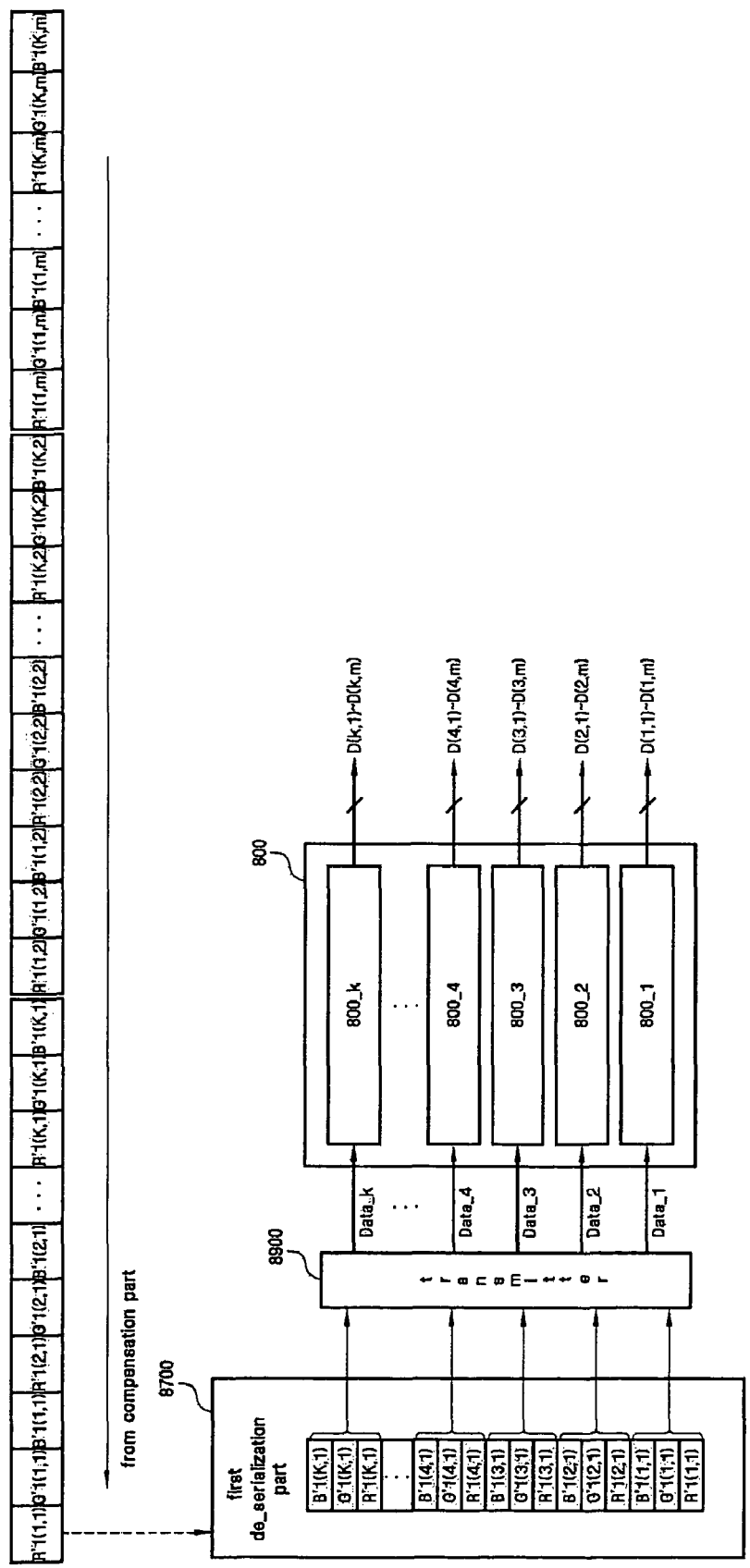

As shown FIG. 9D, the first de-serialization part 8700 receives the first compensation data R'1(1,1)G'1(1,1)B'1(1,1) to R'1(k,m)G'1(k,m)B'1(k,m). The first compensation data R'1(k,m)G'1(k,m)B'1(k,m) correspond to the input image data R(k,m)G(k,m)B(k,m) stored in the fifth line memory 8200 and the sixth line memory 8300. The first de-serialization part 8700 simultaneously transmits the first compensation data R'1(k,m)G'1(k,m)B'1(k,m) having a same m number, e.g., the first compensation data R'1(k,m)G'1(k,m)B'1(k,m) corresponding to the mth data R(k,m)G(k,m)B(k,m), stored in the sub line memories 8300_1 to 8300_k, are transmitted in parallel to the data driver 800 by the transmitter 8900.

The second de-serialization part 8800 receives the second compensation data R'2(1,1)G'2(1,1)B'2(1,1) to R'2(k,m)G'2(k,m)B'2(k,m). The second compensation data R'2(k,m)G'2(k,m)B'2(k,m) corresponding to the input image data R(k,m)G(k,m)B(k,m) stored in the fifth line memory 8200 and the sixth line memory 8300. The second de-serialization part 8800 simultaneously transmits the second compensation data R'2(k,m)G'2(k,m)B'2(k,m) having the same m numbers, e.g., the second compensation data R'2(k,m)G'2(k,m)B'2(k,m) corresponding to the mth data R(k,m)G(k,m)B(k,m), stored in the sub line memories 8300_1 to 8300_k, are transmitted in parallel to the data driver 800 by the transmitter 8900. Thus, a display apparatus according to an exemplary embodiment includes the serialization part 8400, the first de-serialization part 8700 and the second de-serialization part 8800, and a required number of line memories for ACC and PSVA mode driving is substantially reduced. Thus, a manufacturing cost of the timing controller, and therefore the display apparatus, is substantially reduced.

The transmitter 8900 converts the first compensation data R'1, G'1 and B'1 and the second compensation data R'2, G'2 and B'2 to the image signals Data_1-Data_k, and provides the image signals Data_1-Data_k to the data driver 800. The data driver 800 converts the image signals Data_1-Data_k to analog voltages and outputs the analog voltages to the display panel 1000 through the data lines D(1,1)-D(k,m). As described above and shown in FIG. 5, the data driver 800 may include the source drivers 800_k, and each of the source drivers 800_k receives the image signals Data_k from the timing controller 700. The source drivers 800_k are connected to data lines, and thereby apply data voltages to the corresponding data lines. More specifically, the source drivers 800_k apply the data voltages to the corresponding data lines based on the data control signal CONT2 transmitted to the source drivers 800_k from the timing controller 700, and the data voltages may thereby be transmitted to the unit pixels Pu. Each line memory includes sub line memories which are connected to the source driver 800_k. For example, the fifth line memory 8200 may include k sub memories 8200_1-8200_k, and the sixth line memory 8300 may include k sub memories 8300_1-8300_k. The sub memory 8200_k of the fifth line memory 8200 is connected to the sub memory 8300_k of the sixth line memory 8300, and the sub line memory 8300_k of the sixth line memory 8300 is connected to the source driver 800_k through the transmitter 8900. Thus, the image signal data Data_k is based on data stored in the sub memories 8200_k, 8300_k.

As also described in greater detail above, FIG. 7 is a signal timing diagram of a driving method of the display apparatus according to exemplary embodiments shown in FIG. 3, FIG. 4 and FIG. 8. During an initial half-period of a horizontal period 1H, during which the first sub-pixel Ps1 is driven, the data driver 800 outputs an analog voltage of the first compensation data R'1, G'1, B'1 to the data lines D(1,1)-D(k,m). During a latter half-period of the horizontal period 1H, during which the second sub-pixel Ps2 is driven, the data driver 800 outputs an analog voltage of the second compensation data R'2, G'2, B'2 to the data lines D(1,1)-D(k,m).

The gate driver 900 generates gate signals using the gate control signal CONT1 received from the timing controller 700, and a gate-on voltage and a gate-off voltage, which are applied from an external device (not shown). For example, the gate driver 900 may output a first gate signal, which is the gate-on voltage, to the first gate line Gn electrically connected to the first transistor TR1 during the initial half-period of the horizontal period 1H, and may output a second gate signal, which is also the gate-on voltage, to the second gate line Gn+1, adjacent to the first gate line Gn and electrically connected to the second transistor TR2, during the latter half-period of the horizontal period 1H.

As a result, during the initial half-period of the horizontal period 1H, the first sub-pixel Ps1 is turned on and receives the first compensation data R'1, G'1, B'1 and, during the latter half-period of the horizontal period, the second sub-pixel Ps2 is turned on and receives the second compensation data R'2, G'2, B'2. Because the first sub-pixel Ps1 and the second sub-pixel Ps2 receive the first compensation data R'1, G'1, B'1 and the second compensation data R'2, G'2, B'2, respectively, the unit pixel Pu include multiple domains of the liquid crystal molecules. In addition, the first sub-pixel Ps1 and the second sub-pixel Ps2 are charged using the first compensation data R'1, G'1, B'1 and the second compensation data R'2, G'2, B'2, respectively, which contain color compensation data from the first gamma curve GAMMA1 and the second gamma curve GAMMA2, respectively, which are different from each other. Accordingly, in the first sub-pixel Ps1 and the second sub-pixel Ps2, color coordinate values of colors viewed from the front of the display apparatus may be substantially the same as color coordinate values of the colors viewed from the side of the display apparatus, and the display apparatus according to an exemplary embodiment thereby provides a substantially increased viewing angle.

Accordingly, in a display device and a driving method thereof according to exemplary embodiments of the present invention, the display device includes a driving device which provides a substantially widened viewing angle while implementing a substantially reduced amount of line memories.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:
1. A display apparatus comprising:
   a display panel comprising:
      gate lines disposed along a first direction;
      data lines disposed along a second direction substantially perpendicular to the first direction; and
      unit pixels, disposed in rows along the first direction and columns along the second direction, and electrically connected to the gate lines and data lines, each unit pixel including a first sub-pixel and a second sub-pixel;

a timing controller comprising:

a receiver which receives a plurality of image data, each image data of the plurality of image data corresponding to one of the unit pixels, and which transmits the image data in a first order;

a first line memory which receives the image data in the first order from the receiver and stores the image data in the first order;

a serialization part which reads the image data in the first order from the first line memory and serially transmits the image data in a second order different from the first order;

a first compensation part which receives the image data in the second order and generates first compensation data of the image data, the first compensation data corresponding to a first gamma curve; and a second compensation part which receives the image data in the second order and generates second compensation data of the image data, the second compensation data corresponding to a second gamma curve; and a data driver which receives the first compensation data and the second compensation data from the timing controller and converts the first compensation data and the second compensation data to a first grayscale data and a second gray scale data, respectively, wherein the first grayscale data and the second gray scale data are transmitted to the unit pixels by the data lines.

2. The display apparatus of claim 1, wherein when the first grayscale data is transmitted to the first sub-pixel, the second grayscale data is transmitted to the second sub-pixel, and when the first gray scale data is transmitted to the second sub-pixel, the second grayscale data is transmitted to the first sub-pixel.

3. The display apparatus of claim 2, wherein the first sub-pixel is electrically connected to a first gate line of the gate lines and a first data line of the data lines, the second sub-pixel pixel is electrically connected to a second gate line of the gate lines and the first data line, and the second gate line is adjacent to the first gate line.

4. The display apparatus of claim 3, wherein the first grayscale data is transmitted to the first sub-pixel through the first data line when the first sub-pixel is turned on by a first gate signal, and the second grayscale data is transmitted to the second sub-pixel through the first data line when the second sub-pixel is turned on by a second gate signal.

5. The display apparatus of claim 1, wherein the first compensation part includes a first lookup table having an offset value of the first compensation data sampled from the first gamma curve and corresponding to the first grayscale data.

6. The display apparatus of claim 5, wherein the second compensation part includes a second lookup table having an offset value of the second compensation data sampled from the second gamma curve and corresponding to the second grayscale data.

7. The display apparatus of claim 1, wherein the unit pixels of a given row are arranged along the first direction corresponding to the first order in which the receiver receives the image data.

8. The display apparatus of claim 1, wherein the data driver comprises source drivers, and the first line memory comprises sub line memories.

9. The display apparatus of claim 8, wherein the image data which the receiver receives in the first order is divided into data groups, the image data included in an Nth data group of the data groups is stored in an Nth sub line memory of the first line memory, each of the Nth data groups includes the image data, and N is a natural number.

10. The display apparatus of claim 9, wherein the image data transmitted by the serialization part in the second order comprises an Mth image data of the image data of each of the Nth data groups, and the Mth image data of an Nth data group is adjacent to an Mth image data of an (N−1)th data group.

11. The display apparatus of claim 1, wherein the timing controller further comprises a first de-serialization part which receives the first compensation data corresponding to the Mth image data of each of the Nth data groups and transmits the Mth image data of each of the Nth data groups in parallel.

12. The display apparatus of claim 11, wherein the timing controller further comprises a transmitter which receives the Mth image data of each of the Nth data groups and transmits the Mth image data of each of the Nth data groups to an Nth source driver of the source drivers of the data driver.

13. A timing controller for a display apparatus, the timing controller comprising:

a receiver which receives a plurality of image data and transmits image data of the plurality of image data in a first order;

a first line memory which receives the image data in the first order from the receiver and stored the image data in the first order;

a serialization part which reads the image data from the first memory in the first order and serially transmits the image data in a second order different from the first order;

a first compensation part which receives the image data in the second order and generates first compensation data of the image data, the first compensation data corresponding to a first gamma curve; and a second compensation part which receives the image data in the second order and generates second compensation data of the image data, the second compensation data corresponding to a second gamma curve.

14. The timing controller of claim 13, wherein the first compensation part includes a first lookup table having an offset value of the first compensation data sampled from the first gamma curve and corresponding to the first grayscale data.

15. The timing controller of claim 14, wherein the second compensation part includes a second lookup table having an offset value of the second compensation data sampled from the second gamma curve and corresponding to the second grayscale data.

16. The timing controller of claim 13, wherein the first line memory comprises sub line memories.

17. The timing controller of claim 16, wherein the image data which the receiver receives in the first order is divided into data groups, the image data included in an Nth data group of the data groups is stored in an Nth sub line memory of the first line memory, each of the Nth data groups includes the image data, and N is a natural number.

18. The timing controller of claim 17, wherein
the image data transmitted by the serialization part in the second order comprises an Mth image data of the image data of each of the Nth data groups, and
the Mth image data of an Nth data group is adjacent to an Mth image data of an (N−1)th data group.

19. The timing controller of claim 13, wherein the timing controller further comprises a first de-serialization part which receives the first compensation data corresponding to the Mth image data of each of the Nth data groups and transmits the Mth image data of each of the Nth data groups in parallel.

20. The timing controller of claim 19, wherein the timing controller further comprises a transmitter which receives the Mth image data of each of the Nth data groups and transmits the Mth image data of each of Nth data groups in parallel.

21. A method of driving a display panel comprising gate lines disposed along a first direction, data lines disposed along a second direction substantially perpendicular to the first direction, unit pixels disposed in rows along the first direction and columns along the second direction and electrically connected to the gate lines and data lines, each unit pixel including a first sub-pixel and a second sub-pixel, the method comprising:
receiving a plurality of image data, each image data of the plurality of image data corresponding to one of the unit pixels;
transmitting the input image data in a first order;
storing the image data in the first order in a first line memory;
serially transmitting the image data stored in the first line memory in a second order different from the first order;
generating first compensation data of the image data, the first compensation data corresponding to a first gamma curve;
generating second compensation data of the image data, the second compensation data corresponding to a second gamma curve;
converting the first compensation data and the second compensation data to a first grayscale data and a second gray scale data, respectively; and
transferring the first grayscale data and the second gray scale data to the unit pixels with the data lines.

22. The method of claim 21, wherein the transferring the first grayscale data and the second gray scale data comprises:
transferring the first grayscale data to one of the first sub-pixel and the second sub-pixel; and
transferring the second gray scale data to another of the one of first sub-pixel and the second sub-pixel.

23. The method of 22, wherein
the first sub-pixel is electrically connected to a first gate line of the gate lines and a first data line of the data lines,
the second sub-pixel pixel is electrically connected to a second gate line of the gate lines and the first data line, and
the second gate line is adjacent to the first gate line.

24. The method of claim 23, wherein the transferring the first grayscale data and the second gray scale data comprises:
transferring the first grayscale data to the first sub-pixel through the first data line when the first sub-pixel is turned on by a first gate signal; and
transferring the second grayscale data to the second sub-pixel through the first data line when the second sub-pixel is turned on by a second gate signal.

25. The method of claim 21, wherein the storing the image data in the first order in the first line memory comprises:
dividing the image data into data groups; and
storing the image data included in an Nth data group of the data groups in the first line memory,
wherein
each of the Nth data groups includes Mth image data, and M is a natural number.

26. The method of claim 25, wherein
the serially transmitting the image data stored in the first line memory in the second order comprises arranging the Mth image data of each of the Nth data groups in a line, and
an Mth image data of an Nth data group is adjacent to an Mth image data of an (N−1)th data group.

27. The method of claim 26, further comprising transmitting the Mth image data of each of the Nth data groups in parallel.

* * * * *